Jan. 31, 1961 C. L. WEIMER ET AL 2,970,245
BUS DUCT STRUCTURES FOR ELECTRICAL DISTRIBUTION SYSTEMS
Filed Nov. 22, 1957 2 Sheets-Sheet 1

WITNESSES
Edwin E. Bassler
Wm. B. Sellers

INVENTORS
Charles L. Weimer &
Samuel S. Fouse
BY
ATTORNEY

Jan. 31, 1961  C. L. WEIMER ET AL  2,970,245
BUS DUCT STRUCTURES FOR ELECTRICAL DISTRIBUTION SYSTEMS
Filed Nov. 22, 1957

United States Patent Office 2,970,245
Patented Jan. 31, 1961

2,970,245

BUS DUCT STRUCTURES FOR ELECTRICAL DISTRIBUTION SYSTEMS

Charles L. Weimer, Patterson Heights, and Samuel S. Fouse, Aliquippa, Pa., assignors to Westinghouse Electric Corporation, East Pittsburgh, Pa., a corporation of Pennsylvania Filed Nov. 22, 1957, Ser. No. 698,187

5 Claims. (Cl. 317—120)

This invention relates, generally, to bus duct structures for electrical distribution systems and, more particularly to bus duct structures of the plug-in type.

In bus duct of the plug-in type, bus bars are mounted inside the duct housing. Power take-off or plug-in units are provided for attaching to the housing at predetermined locations. Each plug-in unit may comprise a box or cabinet inside of which is mounted a circuit interrupter. Contact members or stab connectors are provided with the cabinet for engaging the bus bars inside the duct housing. Prior stab connectors have usually been of a type which make contact with both flat sides of the bus bar. The contact pressure depended on the spring temper of the material of which the connector was composed and the ampere rating was limited because of the small cross-sectional area of the connector.

An object of the invention is to increase the contact pressure between the stab connectors or contact members on a plug-in unit and the bus bars in a bus duct housing which are engaged by the stab connectors.

Another object of the invention is to increase the current carrying capacity of the contact members or stab connectors on a plug-in unit.

A further object of the invention is to provide stab connectors which can be utilized with bus bars having different configurations and to make contact with the edges of the bus bars.

Still another object of the invention is to provide a simplified mechanism for actuating retractable stab connectors or contact members on a plug-in unit for bus duct.

Other objects of the invention will be explained fully hereinafter or will be apparent to those skilled in the art.

In accordance with one embodiment of the invention, each stab connector for a plug-in unit is made from a solid bar of copper having a generally V-shaped notch in its lower end for engaging the edge of a bus bar inside a bus duct housing. The notch is so shaped that the connector makes equal contact with either a round edge, an edge having rounded corners, or a square edge on the bus bar. The connectors are spring loaded in an insulating base attached to a carrier which is actuated by an external handle to cause the connectors to make or break contact with the edges of the bus bars.

For a better understanding of the nature and objects of the invention, reference may be had to the following detailed description, taken in conjunction with the accompanying drawings, in which.

Figure 1:
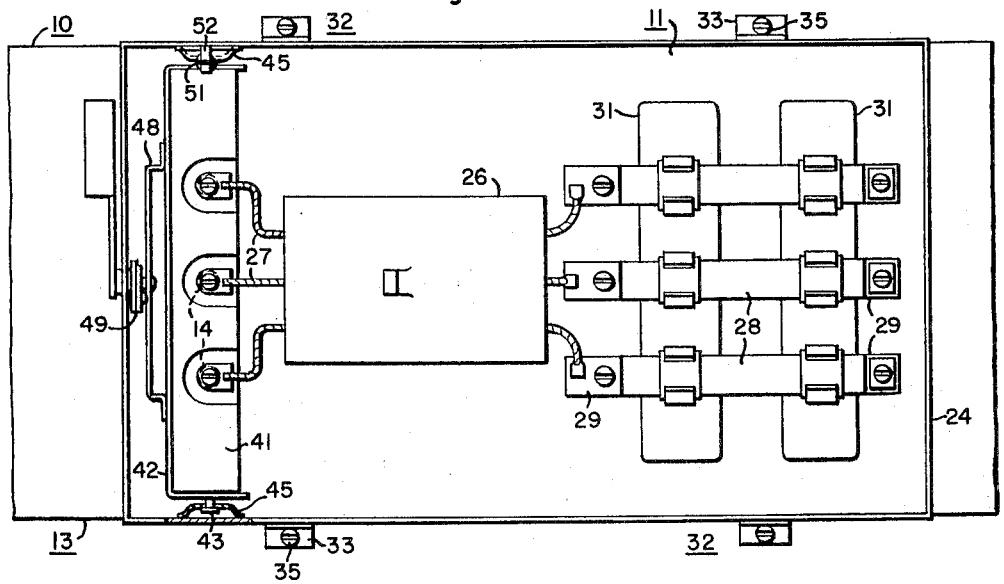
Figure 1 is a view, in plan, of a portion of a bus duct housing and a plug-in unit embodying the principal features of the invention, the cover for the plug-in unit being removed.

Referring to the drawings, and particularly to Fig. 1, the structure shown therein comprises a portion of a bus duct 10 and a plug-in unit 11 which is disposed on one side of the bus duct 10. The bus duct structure is of the plug-in type, such as for example, the structure described in Patent No. 2,780,788, issued February 5, 1957, to L. W. Dyer and W. F. Born. The structure is provided with a plurality of bus bars 12 which are so disposed within a metal housing 13 that they may be engaged by contact members or stab connectors 14 which extend through the bottom of the plug-in unit 11. The bus bars 12 are supported by suitable insulators 15 which are located at regular intervals on alternate sides of the bus duct. As fully described in the aforesaid patent, the bus duct housing 13 is provided with openings 16 for receiving the stab connectors 14. An opening 16 is provided opposite each insulator 15.

Figure 3:
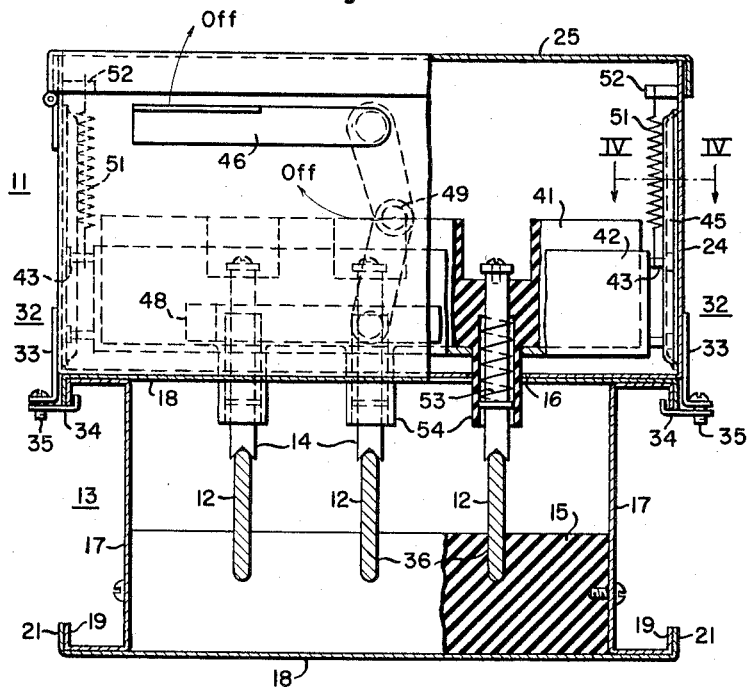
Fig. 3 is a view, partly in end elevation and partly in section, of the structure shown in Fig. 2.
Figure 4:
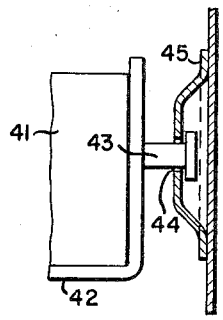
Fig. 4 is a view in section, taken along the line IV—IV in Fig. 3.

As shown most clearly in Fig. 3, the housing 13 comprises generally channel-shaped end walls 17 and side walls 18. The channel-shaped walls 17 have inwardly extending flanges 19 which are overlapped by flanges 21 on the side walls 18. As previously explained, the openings 16 for receiving the stab connectors 14 are located in the side walls 18 alternately on opposite sides. A cover plate (not shown) is provided for each opening 16 in the side walls 18. When it is desired to install a plug-in unit in a particular opening the cover plate may be slid along the housing 13 to provide access to the opening 16.

The plug-in unit 11 comprises a metal casing 24 having a removable or openable cover 25. A circuit interrupter 26, which may be either an automatic circuit breaker or a manually operable switch, is mounted inside the casing 25 and is electrically connected to the stab connectors 14 by flexible conductors 27, thereby connecting the interrupter 26 to the bus bars 12 when the plug-in unit is properly installed on the bus duct housing 13.

If desired, the load side terminals of the interrupter 26 may be connected to fuses 28 which are mounted in fuse terminals 29 supported on an insulating base 31 attached to the bottom wall of the cabinet 24. It will be understood that conductors (not shown) may be connected to the fuse terminals to supply power for operating electric apparatus. In this manner, the plug-in unit may be located at the most convenient position along the bus duct housing for supplying power to various machines or other apparatus in a factory.

Figure 2:
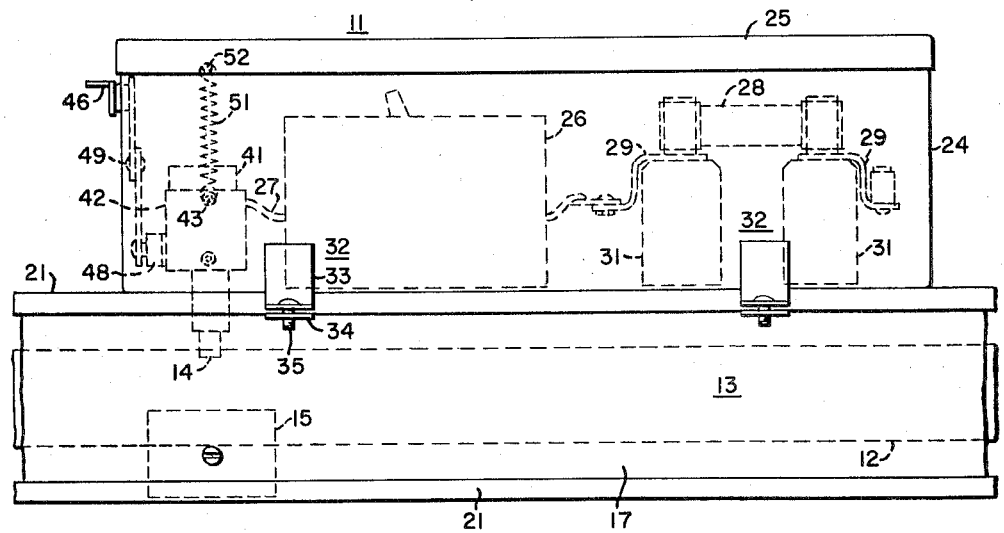
Fig. 2 is a view in side elevation of the plug-in unit and the duct housing.

As shown in Figs. 2 and 3, the plug-in unit 11 may be provided with combined guide and clamping devices 32 for retaining the plug-in unit on the bus duct housing. As shown, each clamping device 32 comprises an L-shaped guide member 33 secured to a side of the cabinet 24 and a clamping member 34 which is attached to the short leg of the L-shaped member 33 by a screw 35. The clamping member 34 is drawn against the flanges 19 and 21 of the housing 13 when the screw is tightened, thereby holding the plug-in unit in operating position on the duct housing.

As previously explained, the bus bars 12 are supported in the housing 13 by the insulators 15, one of which is located opposite each opening 16 and is disposed between the bus bars 12 and the side wall 18 of the housing 13 opposite the opening 16. If desired an operating mechanism of the type described in our copending application, Serial No. 640,863, filed February 18, 1957, may be mounted on the cover 25 for operating the circuit interrupter 26. An interlocking mechanism of the type described in our aforesaid copending application may be provided for so controlling the switch actuating mechanism and the the contact actuating mechanism herein described that is necessary for the switch to be opened before the contact members or stab connectors can be engaged with or disengaged from the bus bars, and both the switch and the contact member must be opened before the cover of the plug-in unit can be opened.

As explained hereinbefore, stab connectors or contact members previously utilized have been of a type which makes contacts both flat sides of the bus bars. The contact pressure depends on the spring temper of the material of which the stab connectors were composed. The ampere rating was limited because of the small cross-sectional area of the stab or contact member. If the stabs became overheated as a result of conducting current above their rating there was a possibility of their temper being reduced, thereby reducing the contact pressure which resulted in more overheating.

In order to increase the current carrying capacity of the stab connectors or contact members and also maintain a uniform contact pressure between the connectors and the bus bars, the present stab connectors are made from an elongated solid bar of copper or other suitable material. The shape of a connector or contact member may be either round, square or rectangular in cross-section.

A generally V-shaped notch 37 is provided in the lower end of each contact member 14 to engage the edge of a bus 12. The notch 37 is so shaped that equal contact is made with either a round or semicircular edge, an edge having round curved corners, or an edge having square corners. The solid mass of copper in the stab connector or contact member provides a higher current capacity than was available with stab connectors of prior types.

If desired, round bus bars may be utilized instead of the flat bus bars illustrated. As previously explained, the notch 37 in each connector 14 is so shaped that it makes good contact with a semicircular surface, thereby enabling the present connector to be utilized with a round bus bar.

In order to increase the safety of the bus duct structure and particularly the plug-in units, the present stab connectors are of a retractable type. As shown, the stab connectors 14 are mounted in an insulating base 41. A metal carrier 42 is attached to the base 41. Spaced guide pins 43 are secured to each end of the carrier 42 and are slidably disposed in a slot 44 in a guide member 45 secured to a side of the cabinet 24 by welding or other suitable means.

An external operating handle 46 is rotatably mounted in one end of the cabinet. The handle 46 has a projection through the end of the cabinet 24 and is connected to a bracket 48 on the carrier 42 by means of a toggle linkage mechanism 49. When the carrier 42 and the insulating base 41 are in their lowermost position the linkage mechanism is past dead center, thereby locking the carrier and the base in their lowermost position.

When the handle 46 is moved upwardly, as shown in Fig. 3, the carrier 42 is raised by means of the toggle linkage mechanism. The carrier is retained in its uppermost position by springs 51 which are attached to the carrier and to pins 52 secured on the inside of the cabinet 24. The guide pins 43 cause the carrier to move with a straight line motion. Thus, when the handle 46 is actuated it causes the carrier and the stabs to travel either up or down to make or break contact with the bus bars.

In order to maintain a uniform contact pressure between the contact members 14 and the bus bars, loading springs 53 are provided for the contact members. As shown, a spring 53 surrounds each contact member which is slidably disposed in a hollow projection 54 on the base 41. The springs 53 are compressed when the carrier 42 is lowered to cause the contact members 14 to engage the bus bars.

As previously explained, the upper ends of the contact members 14 are connected to the interrupter by flexible conductors 27, thereby completing electric circuits from the bus bars to the interrupter 26 when the stab connectors engage the cross bars. As also previously explained, an interlocking mechanism may be provided to make it possible to disengage the stab connectors or contact members 14 from the bus bars while the unit is under load. Also, the cover may be provided with an interlock to prevent opening the cover until after the contacts are disengaged from the bus bars.

From the foregoing description it is apparent that the structure herein described provides a plug-in unit which may be utilized with bus duct having bus bars of different types therein. The contact members or stab connectors of the plug-in unit are of a retractable type. They have a higher current carrying capacity than stab connectors of prior types. The operating mechanism for actuating the retractable contact members is of a simplified construction.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a bus duct structure, in combination, a generally rectangular housing having spaced openings in at least one side thereof, a plurality of elongated bus bars disposed inside the housing longitudinally of the housing, insulators disposed inside the housing for supporting the bus bars, each bus bar having an edge portion accessible through the openings in the housing, a plug-in unit having stab connectors extensible through one of said openings to engage said bus bars, an elongated carrier for the stab connectors, slotted guide means on the plug-in unit at the ends of the carrier, guide members on the ends of the carrier disposed in the slotted guide means to guide the carrier and the stab connectors in a straight line, actuating means connected to the carrier substantially midway between its ends for reciprocating the carrier, and each stab connector being a solid member with an end engaging the edge portion of a bus bar.

2. In a plug-in unit for engaging bus bars, in combination, a cabinet, a circuit interrupter disposed inside the cabinet, elongated contact members extending through an opening in one wall of the cabinet to engage bus bars, flexible conductors connecting said contact members to said interrupter, an elongated carrier for said contact members, actuating means on the outside of the cabinet for moving said carrier to cause the contact members to make or break contact with the bus bars, a single toggle linkage inside the cabinet connecting said actuating means with said carrier, slotted guide means attached to the inside of the cabinet, guide members on the ends of the carrier disposed in the slotted guide means for guiding the movement of the carrier in a straight line, and each contact member having an end for engaging a bus bar.

3. In a plug-in unit for engaging bus bars, in combination, a cabinet, a circuit interrupter disposed inside the cabinet, elongated contact members extending through an opening in one wall of the cabinet to engage bus bars, a flexible conductor connecting one end of each contact member to said interrupter, an insulating base for said contact members, an elongated carrier attached to said base, actuating means connected to the carrier substantially midway between its ends for moving said carrier to cause the contact members to make or break contact with the bus bars, guide means at the ends of the carrier for guiding the carrier in a straight line, said contact members being retractable into said cabinet, said contact members being slidably disposed in said base, spring means for maintaining contact pressure between the contact members and the bus bars when the contact members are extended from the cabinet, and each contact member having a notch in the end opposite the one to which said flexible conductor is connected for engaging a bus bar.

4. In a bus duct structure, in combination, a housing having an opening in one side thereof, a plurality of bus bars disposed inside the housing longitudinally of the housing, insulators disposed inside the housing for supporting the bus bars, each bus bar having a curved surface accessible through the opening in the housing, a plug-in unit having elongated contact members extensible through said opening to engage the bus bars, an elongated carrier for the contact members, actuating means connected to the carrier substantially midway between its ends for reciprocating the carrier, slotted guide means on the plug-in unit at the ends of the carrier, guide members on the ends of the carrier disposed in the slotted guide means to guide the carrier and the contact members in a straight line.

5. In a bus duct structure, in combination, a housing having an opening in one side thereof, a plurality of bus bars disposed inside the housing longitudinally of the housing, insulators disposed inside the housing for supporting the bus bars, each bus bar having a curved surface accessible through the opening in the housing, a plug-in unit having solid cylindrical contact members movable in said opening to engage the bus bars, an elongated carrier for the contact members, actuating means connected to the carrier substantially midway between its ends for reciprocating the carrier, slotted guide means on the plug-in unit at the ends of the carrier, guide members on the ends of the carrier disposed in the slotted guide means to guide the carrier and the contact members in a straight line.

References Cited in the file of this patent

UNITED STATES PATENTS

| | | |
|---|---|---|
| 1,223,222 | Tomlinson | Apr. 17, 1917 |
| 1,233,062 | Johansson | July 10, 1917 |
| 2,088,105 | Frank | July 27, 1937 |
| 2,231,056 | De Mask | Feb. 11, 1941 |
| 2,306,353 | Cole | Dec. 22, 1942 |
| 2,725,541 | Born | Nov. 29, 1955 |
| 2,780,788 | Dyer | Feb. 5, 1957 |

FOREIGN PATENTS

| | | |
|---|---|---|
| 675,111 | Great Britain | July 2, 1952 |